United States Patent [19]
Bowden

[11] Patent Number: 5,849,100
[45] Date of Patent: Dec. 15, 1998

[54] METHOD FOR CLEANING OILY OBJECTS

[75] Inventor: Donald Bowden, Huntsville, Ala.

[73] Assignee: Bowden Industries, Huntsville, Ala.

[21] Appl. No.: 870,458

[22] Filed: Jun. 6, 1997

Related U.S. Application Data

[63] Continuation of Ser. No. 441,298, May 15, 1995, abandoned.

[51] Int. Cl.$^6$ .............................. B08B 7/04; B30B 9/02; B01D 24/46; B01D 41/00
[52] U.S. Cl. .............................. 134/10; 134/16; 134/18; 134/26; 134/29; 134/40; 210/708; 210/709
[58] Field of Search .................................. 134/40, 10, 24, 134/42, 18, 16, 26, 29; 210/708, 709, DIG. 5

[56] References Cited

U.S. PATENT DOCUMENTS

| | | | |
|---|---|---|---|
| 2,711,978 | 6/1955 | Groom | 134/10 |
| 4,082,867 | 4/1978 | Henley et al. | 427/327 |
| 4,255,950 | 3/1981 | Lazaroff | 68/18 F |
| 4,315,822 | 2/1982 | Jaisinghani | 210/794 |
| 4,319,930 | 3/1982 | Yano et al. | 134/10 |
| 4,426,293 | 1/1984 | Mason et al. | 210/636 |
| 4,565,583 | 1/1986 | Venetta | 134/12 |
| 4,766,916 | 8/1988 | Bowden | 134/109 |
| 4,961,858 | 10/1990 | Spei et al. | 210/708 |
| 5,000,857 | 3/1991 | Kunkel | 210/708 |
| 5,145,586 | 9/1992 | Taggart et al. | 210/708 |
| 5,207,895 | 5/1993 | Basseen et al. | 210/95 |
| 5,252,138 | 10/1993 | Guymon | 134/42 |
| 5,298,079 | 3/1994 | Guymon | 134/16 |
| 5,344,255 | 9/1994 | Toor | 405/128 |
| 5,350,457 | 9/1994 | Kitazawa et al. | 134/10 |
| 5,350,527 | 9/1994 | Kitko | 210/804 |
| 5,378,353 | 1/1995 | Koch | 210/86 |
| 5,387,379 | 2/1995 | Atarashi et al. | 264/37 |
| 5,421,883 | 6/1995 | Bowden | 118/73 |
| 5,468,385 | 11/1995 | Inoue | 210/243 |
| 5,503,681 | 4/1996 | Inada et al. | 134/1 |
| 5,520,825 | 5/1996 | Rice | 210/802 |
| 5,542,983 | 8/1996 | Hamilton et al. | 134/10 |

*Primary Examiner*—Harold Y. Pyon
*Attorney, Agent, or Firm*—Dowell & Dowell, P.C.

[57] ABSTRACT

A cleaning method for removing oils, grease, machining debris and like substances from machine parts and other objects includes a wash tank containing a wash solution, rinse tanks for rinsing the washed objects, and an oil separator containing a concentrated detergent solution for separating oil and detergent in the used wash solution from each other. The separated detergent is returned to the wash tank for further parts cleaning, and the separated oil may be reused for machining purposes. The apparatus automatically maintains the liquid in the wash tank and rinse tanks in an effective condition to satisfactorily clean oily objects.

11 Claims, 6 Drawing Sheets

METHOD FOR CLEANING OILY OBJECTS

This application is a continuation of application Ser. No. 08/441,298, filed May 15, 1995, now abandoned.

BACKGROUND OF THE INVENTION

1. Field of the Invention

The invention is directed to the field of parts cleaning, and, more particularly, to an apparatus and method for removing lubricants, dirt, machining fragments and like debris from machine parts and other objects.

2. Background of the Related Art

Cleaning apparatuses are known for removing lubricants including grease and oil, dirt, machining debris and like solids from used and newly produced machine parts and articles of manufacture. In many instances, the service life of parts, as well as their associated apparatuses, can be extended by periodic cleaning.

Vapor degreasers and chlorinated solvents have been widely used in the industrial parts cleaning industry. In recent years, however, this industry has experienced a substantial change in the processes and chemicals employed to clean parts, primarily due to EPA mandates that have made vapor degreasers and chlorinated solvents illegal or otherwise prohibitively expensive to use. Consequently, the industry has developed other types of parts cleaning systems and has identified other effective and less hazardous cleaning chemicals.

Particularly, the industrial parts cleaning industry has shifted to the use of water-based cleaning systems which employ detergents as the cleaning agent. Although representing an improvement, the known water-based cleaning systems are limited by their own unique problems. Most importantly, such cleaning systems require an enormous volume of waste fluid discharge to maintain the wash and rinse tanks in a sufficiently clean condition to consistently achieve satisfactory cleaning of parts.

Waste fluid discharge is comprised of rinse water containing detergent and possibly some oils, and detergent contaminated with emulsified oils. The problems associated with waste fluid discharge vary from location to location. Some industrial parts cleaning plants have on-site waste water treatment facilities to treat the waste fluid discharge before it is dumped into a sewer system. In such plants the nature of the discharge depends on the particular facility's treatment capability. Plants not having on-site treatment capabilities discharge waste directly to the sewer. The local waste water treatment plant dictates what materials the plants are permitted to discharge. Nearly all emulsified oils, as well as combinations of these oils and water and detergent, are considered hazardous waste and must be hauled away from the facility at great expense.

Thus, in view of the inadequacies of the known industrial parts cleaning systems, there is a need for a parts cleaning system capable of removing oil and other lubricants from parts and other objects using water-based detergents, that reduces water and detergent consumption and essentially eliminates the problem of waste material discharge.

SUMMARY OF THE INVENTION

The present invention has been made in view of the above-explained inadequacies of the known cleaning systems and has as an object to provide an improved cleaning apparatus and method for cleaning oily objects such as machine parts and the like, using water-based detergents.

Another object of the invention is to provide an apparatus and method for cleaning oily objects which minimizes water and detergent consumption.

A further object of the invention is to provide an apparatus and method for cleaning oily objects which separates detergent and oil contained in used wash solution from each other in a satisfactory condition to enable the detergent to be reused for further parts cleaning and the oil to be reused to machine parts.

Additional objects and advantages of the present invention will become apparent from the description which follows, considered in conjunction with the accompanying drawing figures, or by practice of the invention.

To achieve the objects of the invention, as embodied and broadly described herein, the apparatus in accordance with a preferred embodiment of the invention comprises a wash tank which contains a wash solution comprised of a first detergent solution. The first detergent solution has an effective concentration of detergent to remove oil from oily objects and form a contaminated wash solution containing an oil emulsion comprised of detergent and oil.

The apparatus also includes an an oil separator which contains a second detergent solution having a substantially greater concentration of detergent than the first detergent solution. Means are provided for transporting contaminated wash solution from the wash tank to the oil separator.

The oil separator comprises means for introducing oil emulsion into the second detergent solution to separate the detergent and oil in the oil emulsion from each other.

The apparatus further comprises a separated detergent transfer means for transferring separated detergent from the oil separator to the wash tank to increase the concentration of detergent in the first detergent solution to the effective concentration to ensure consistent cleaning.

The method in accordance with a preferred embodiment of the invention comprises the steps of immersing an oily object in a wash tank containing a first detergent solution to remove oil from the object and form a contaminated wash solution containing an oil emulsion comprised of detergent and oil.

Contaminated wash solution is transferred from the wash tank to an oil separator containing a second detergent solution, the concentration of detergent in the second detergent solution is substantially greater than the concentration of detergent in the first detergent solution.

Oil emulsion in the contaminated wash solution is introduced into the second detergent solution to separate the detergent and oil in the oil emulsion from each other. Separated detergent is transferred from the oil separator to the wash tank to increase the concentration of detergent in the first detergent solution to the effective concentration to ensure the consistent removal of oil from oily objects.

DETAILED DESCRIPTION OF THE PREFERRED EMBODIMENT

Figure 1:
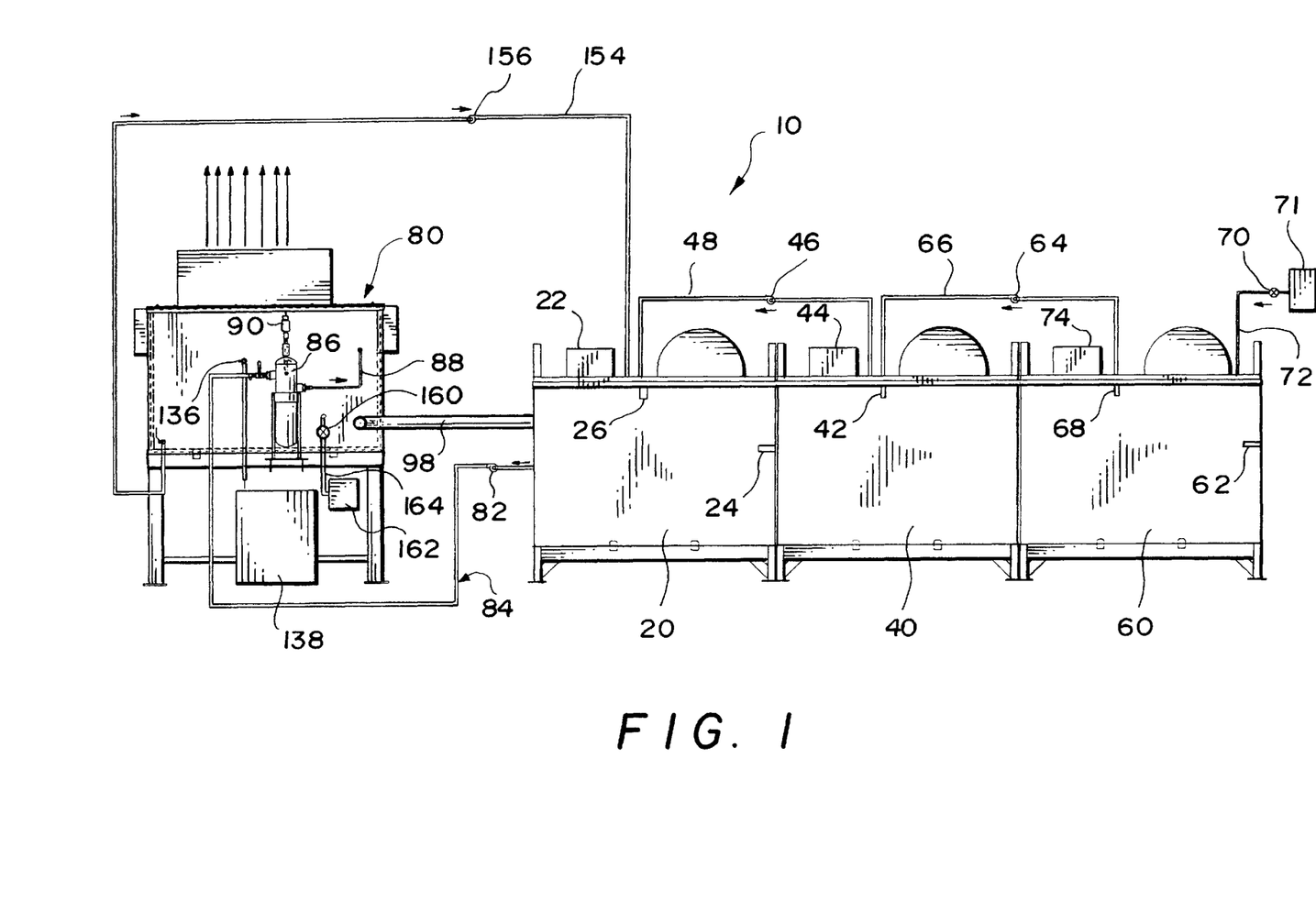
FIG. 1 is an illustrational view of a cleaning apparatus in accordance with a preferred embodiment of the invention.

FIG. 1 illustrates a cleaning apparatus 10 in accordance with a preferred embodiment of the invention. The apparatus comprises three tanks 20, 40 and 60, arranged in series, and an oil separator 80.

Wash tank 20 contains a water-based detergent solution for removing lubricants such as grease and oils from oily machine parts and other articles of manufacture. Hereinafter such lubricants are referred to generally as oils. The wash tank also removes dirt, machining debris and like solid substances from parts.

The tanks 40 and 60 are rinse tanks containing rinse water. The rinse water is preferably deionized water. The washed parts are placed first in the first rinse tank 40 to remove detergent and oil carried over from the wash tank 20, and then in the second rinse tank 60 to remove residual detergent and oil remaining on the parts after the first rinsing.

A conductivity sensor 62 is mounted in the second rinse tank 60 to monitor the contamination level of the rinse water and, particularly, the concentration of residual detergent and oil. The sensor 62 signals a control circuit (not shown) when the detergent and oil concentration reaches a set level of the sensor. The set level corresponds to a detergent and oil concentration approximately above which the rinse water is unable to adequately finally rinse the parts.

When the contamination level in the second rinse tank increases to the set level of the sensor 62, the second rinse tank 60 is purged. Purging involves automatically activating a backflow pump 64 to transfer liquid into the first rinse tank 40 through piping 66. The movement of the contaminated fluid in the direction opposite to the direction of movement of the parts during the cleaning process is referred to herein as "backflow."

A float switch 68 is mounted in the second rinse tank 60 to maintain the rinse water at a desired level. Whenever the level in the tank 60 drops to below the set level of the float switch, a valve 70 is automatically opened to introduce clean deionized water from an exterior supply source 71 into the second rinse tank via piping 72. When the second rinse tank 60 is adequately filled, the valve 70 is automatically closed to shut off the flow of deionized water. Deionized water is also periodically added to the second rinse tank 60 from the supply source during normal operation to compensate for water evaporation.

In the first rinse tank 40, a float switch 42 is also provided to maintain a desired rinse fluid level. If the fluid level decreases to below the set level of the float switch 42 due to carry over into the second rinse tank 60 and normal evaporation, the backflow pump 64 is automatically activated to backflow rinse water from the second rinse tank 60 into the first rinse tank, until the desired level is again established in the first rinse tank. Backflow into the first rinse tank decreases the rinse water level in the second rinse tank, causing deionized water to be added to the second rinse tank if the level of rinse water drops to below the set level of the float switch 68.

In the wash tank 20, a float switch 26 is provided to maintain the wash liquid at an effective level to clean parts. If the wash liquid level drops to below the effective level due to carry over into the first rinse tank 40 and normal water evaporation, a backflow pump 46 is automatically activated to cause a sufficient quantity of rinse water to backflow from the first rinse tank 40 into the wash tank 20 via a conduit 48 to re-establish the effective level. Backflow into the wash tank decreases the liquid level in the rinse tank 40, causing rinse water to be transferred from the second rinse tank 60 to the first rinse tank 40, and causing deionized water to be added to the second rinse tank as described above.

By transferring liquid between the wash tank and rinse tanks in the above-described manner, an adequate liquid condition is maintained in each tank so that the parts are consistently cleaned. Residual detergent and oil carried by the wash parts from the wash tank 20 is returned to the wash tank, so as to reduce contamination of the rinse tanks and ensure that the parts are adequately rinsed. In addition, the backflow sequence reduces water usage because an outside source of clean water is only required for the second rinse tank 60.

During the wash cycle of the cleaning process, oily parts are immersed in the wash solution contained in the wash tank 20. The wash solution contains water and a detergent solution. The detergent solution is preferably comprised of sodium meta-silicate pentahydrate or sodium silicate, sodium xylene sulfonate, a surfactant, and the balance being water. The surfactant may be a non-ionic surfactant, an anionic surfactant or a cationic surfactant. The water is preferably deionized water. A preferred detergent solution contains from about 0.2 to about 2 lb/gal sodium meta-silicate pentahydrate or sodium silicate, from about 2 to about 6 lb/gal sodium xylene sulfonate, from about 0.2 to about 2 lb/gal of a surfactant, and the balance of the gallon is deionized water. A more preferred detergent solution contains about 0.9 lb/gal of sodium meta-silicate pentahydrate, about 4.1 lb/gal sodium xylene sulfonate, about 0.94 lb/gal of a non-ionic surfactant, and the balance of the gallon is deionized water.

The detergent solution contains an optimum ratio of detergent to water to provide the most effective cleaning action. The optimum ratio is also the concentration most effective to emulsify the oils removed from the oily parts. The emulsified oils, or "emulsions", are comprised of oil, detergent and water. The individual components of emulsions do not naturally separate from each other when allowed to settle, and consequently emulsions must be disposed of as hazardous waste.

The wash solution is agitated in the wash tank 20 by an agitating device 22 to enhance the removal of oil and other substances from the parts, maintain the removed oil in solution to prevent emulsions from coalescing as a surface layer in the wash tank, and decrease the time required to clean the oily parts. The agitating device 22 is preferably a liquid turbocharger as disclosed in U.S. Pat. No. 5,421,883 to Bowden, filed Mar. 15, 1994 and entitled "Industrial Parts Cleaning Method and System," and incorporated herein by reference.

A liquid turbocharger 44 is mounted in the first rinse tank 40, and a liquid turbocharger 74 is mounted in the second rinse tank 60, to enhance the removal of residual oil and detergent from the cleaned parts.

The oily parts are preferably contained in a parts washer rotator or rack (not shown) as also disclosed in U.S. Pat. No. 5,421,883 to Bowden. The rotator/rack automatically loads the parts in sequence into the wash tank 20, the first and second rinse tanks 40, 60, and finally a parts dryer (not shown). The machine also rotates the parts to enhance the removal of machining debris and the like from the parts.

As the concentration of oil in the wash solution in the wash tank 20 is increased, the wash solution becomes less effective in removing oil from the parts. To ensure that the wash solution retains its cleaning ability to achieve consistent parts cleaning, the detergent solution is maintained at an effective concentration to satisfactorily remove oils from parts. This is achieved by monitoring the condition of the wash solution using a conductivity sensor 24, which measures the conductivity of the wash solution. The conductivity is directly proportional to the concentration of the detergent solution. Accordingly, a measured conductivity below a predetermined value indicates that the detergent concentration is too low, and detergent solution needs to be added to the wash solution to re-establish the proper concentration.

A float switch 26 is also mounted in the wash tank 20 to maintain an adequate level of wash solution. As described in greater detail below, in those instances when the float switch indicates a low liquid level, water and/or detergent solution are added to the wash tank to re-establish the desired liquid level and detergent concentration.

During the normal operation of the cleaning apparatus, a small quantity of oil-contaminated wash solution is periodically removed from the wash tank 20 and introduced into an oil separator 80. The oil separator separates from each other the oil and detergent in the oil emulsion contained in the used wash solution.

To transfer oil-contaminated wash solution from the wash tank 20 to the oil separator 80, a coalescing tank feed pump 82 is activated to pump a quantity of the wash solution through a coalescing tank feed pump conduit 84. The wash solution is passed through a feed pump filter 86 before entering the oil separator to prevent solids from being introduced into the oil separator. The filtered wash solution is introduced into the oil separator through piping 88. A feed pump filter switch 90 is provided to shut off the oil separator if the coalescing tank feed pump filter 86 requires replacement.

Figure 2:
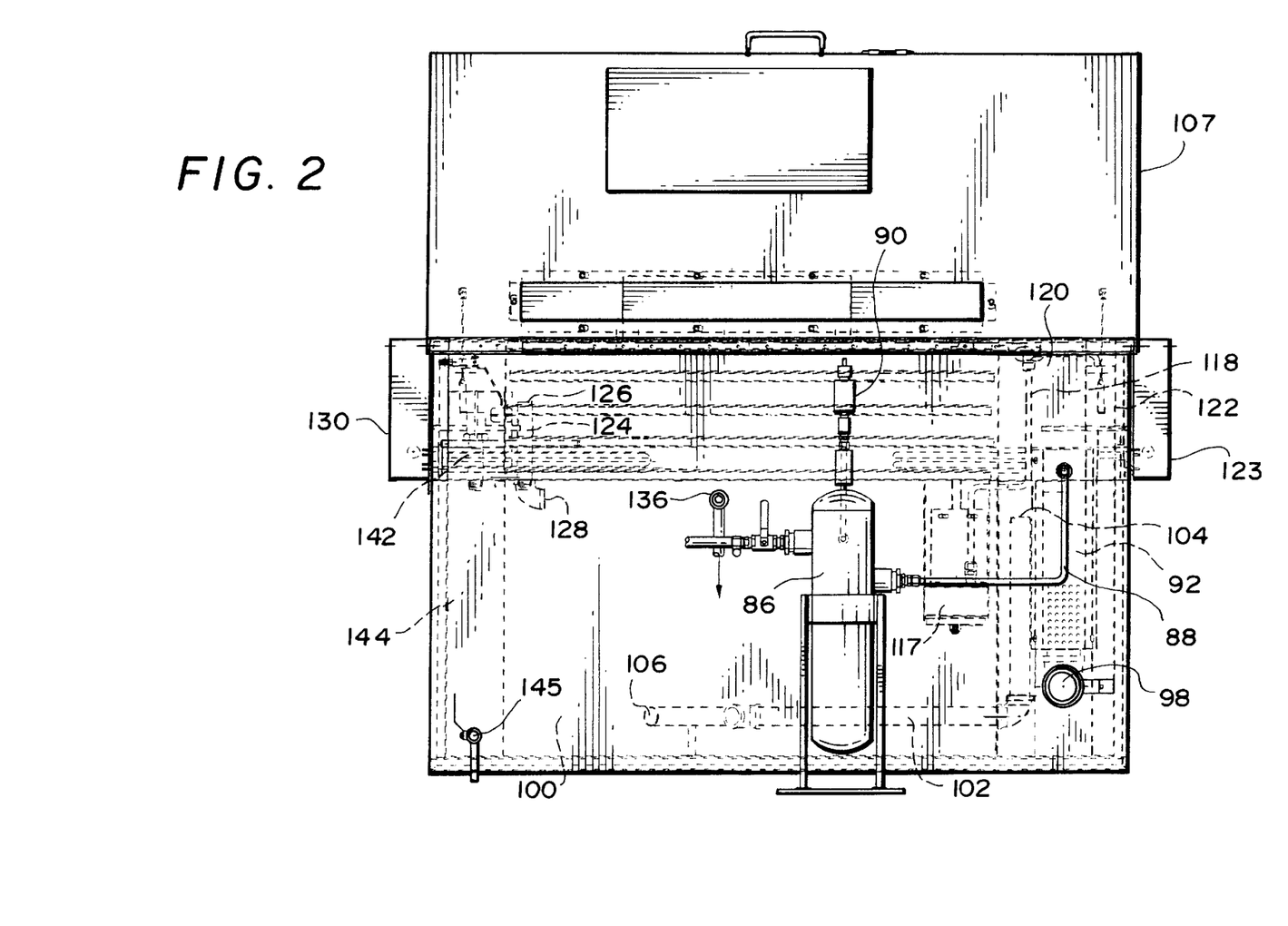
FIG. 2 is a front elevational view of an oil separator in accordance with a preferred embodiment of the invention.

Referring to FIG. 2, the filtered wash solution is introduced into a coalescing tank 92 of the oil separator 80. Within the coalescing tank, the emulsion in the wash solution naturally rises to the surface of the liquid and coalesces as an emulsion layer. The liquid below the emulsion layer is comprised of water and detergent, and normally only a small percentage of oil.

Figure 5:
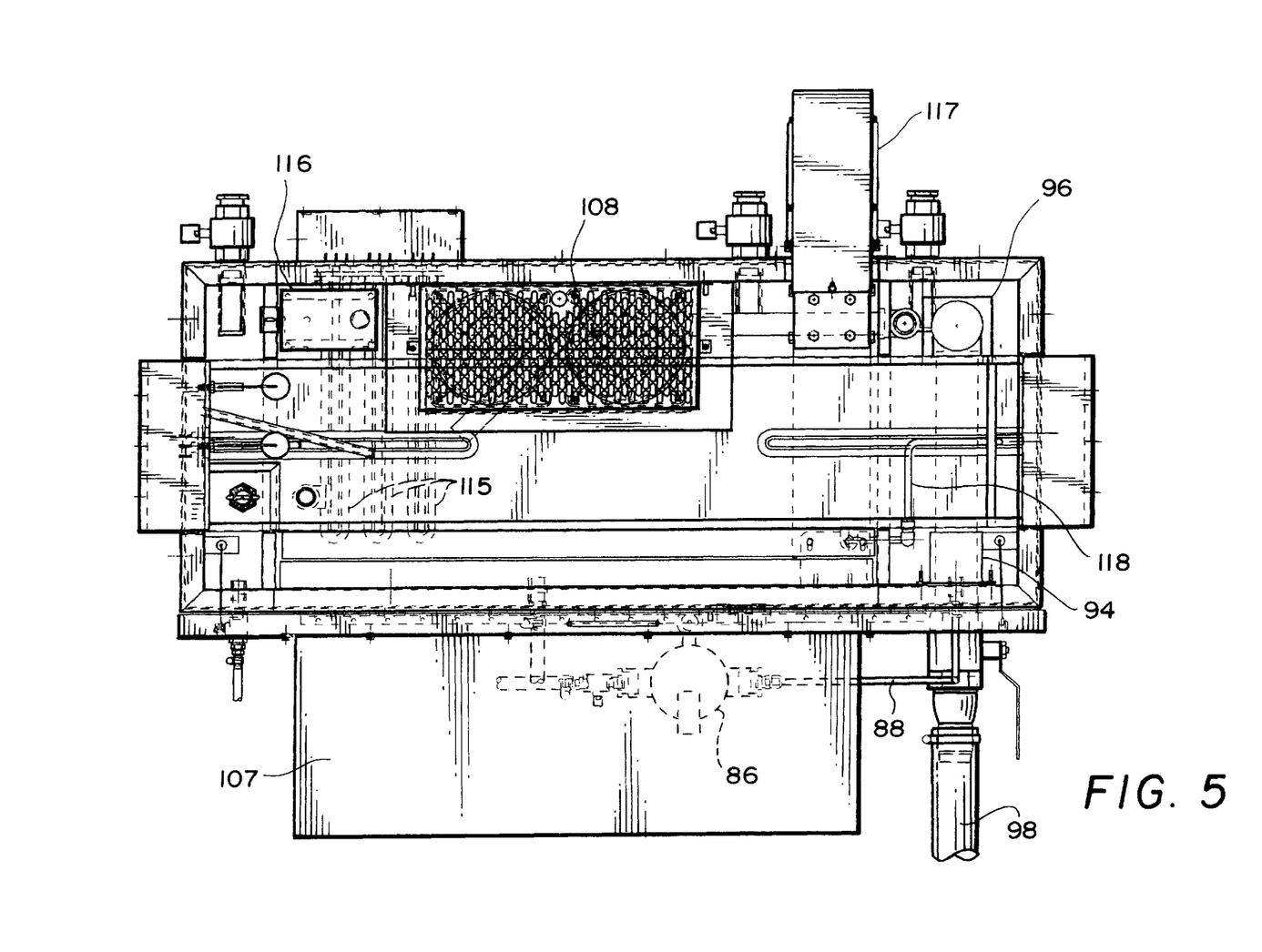
FIG. 5 is a top plan view of the oil separator in accordance with a preferred embodiment of the invention.

A coalescing tank feed baffle 94 (FIG. 5) diffuses the flow of the wash solution into the coalescing tank 92 and prevents the disturbance of the surface of the liquid so as to enhance coalescing of the emulsion. The liquid below the emulsion layer is returned to the wash tank 20 by flowing under a coalescing tank return pipe shield 96 (FIG. 5). The shield 96 traps the floating emulsion at the top of the coalescing tank 92, and the underlying liquid flows back into the wash tank 20 under the force of gravity via a coalescing tank return pipe 98.

The fluid level in the coalescing tank 92 is set by adjusting the height of the coalescing tank return pipe 98.

Referring to FIG. 2, the oil separator 80 comprises an evaporating tank 100. The evaporating tank is in fluid communication with the coalescing tank 92 through an evaporating tank feed pipe 102. The evaporating tank feed pipe includes an upper end 104 located within the coalescing tank, and a lower end 106 located above the bottom surface of the evaporating tank. The coalesced emulsion in the coalescing tank is introduced into the evaporating tank and blended with a concentrated detergent having a substantially greater concentration of detergent than the wash solution in the wash tank 20.

Figure 4:
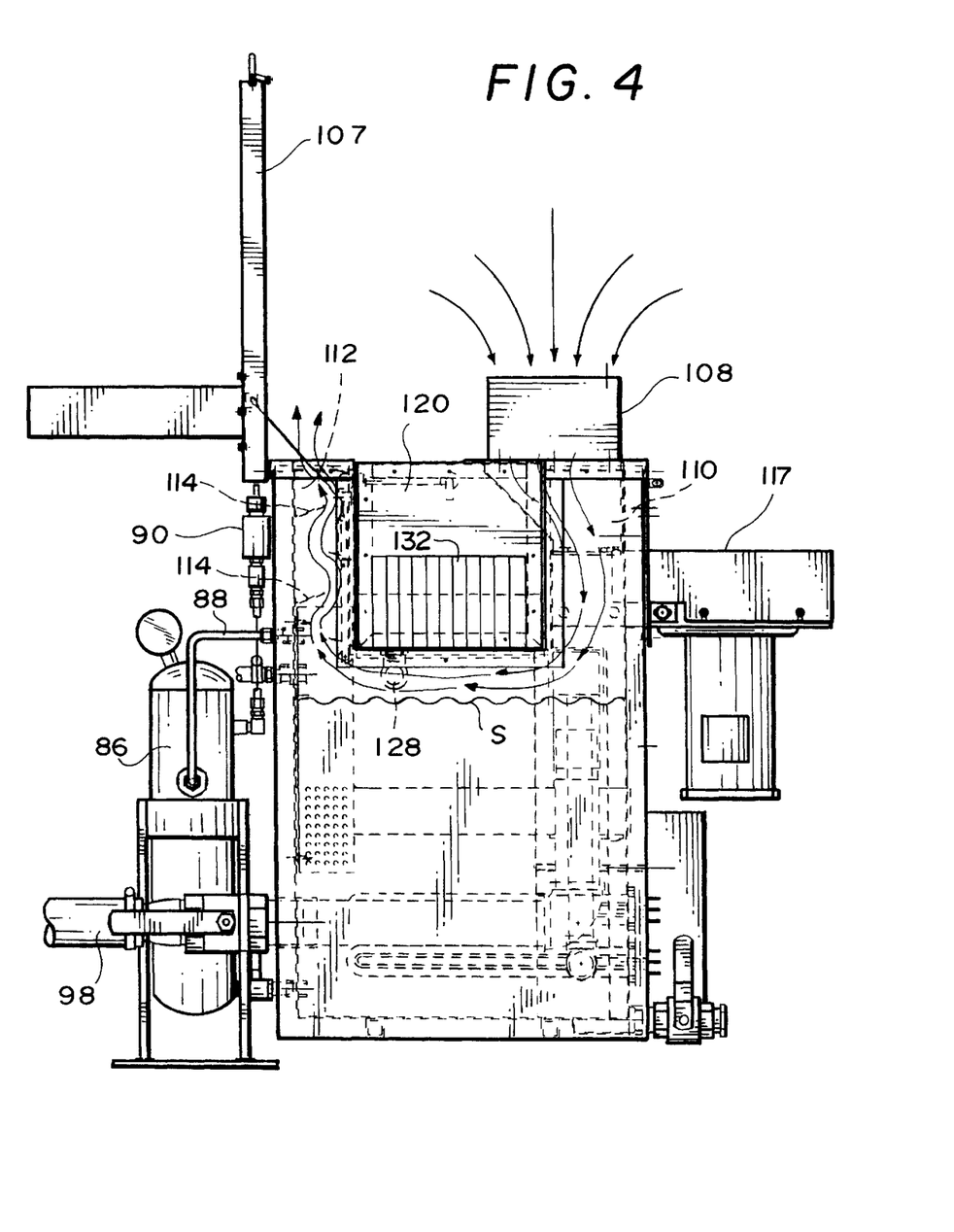
FIG. 4 is a side elevational view, opposite the side of FIG. 3, of the oil separator of FIG. 2.

The evaporating tank 100 is open to the atmosphere to enable the continuous evaporation of water. Means are provided in the evaporating tank to increase the rate of evaporation. As illustrated in FIGS. 4 and 5, ambient air is drawn into the evaporating tank by rotary fans 108 and directed downward through an air inlet 110. The air passes over the surface "S" of the liquid and picks up moisture. The air carries the moisture upward through an air outlet 112 and out of the evaporating tank. Flow baffles 114 are positioned in the air outlet 112 to prevent water droplets in the air from leaving the evaporating tank by forcing the air to travel a tortuous path.

As illustrated in FIG. 5, heaters 115 are mounted in the evaporating tank 100 to heat the liquid contained therein to enhance evaporation. A unit 116 comprises a temperature sensor to sense the temperature of the liquid in the evaporating tank, a low level float switch for deactivating the heaters 115 if a low liquid level is sensed in the evaporating tank, and a conductivity sensor for monitoring the detergent concentration in the evaporating tank.

Figure 3:
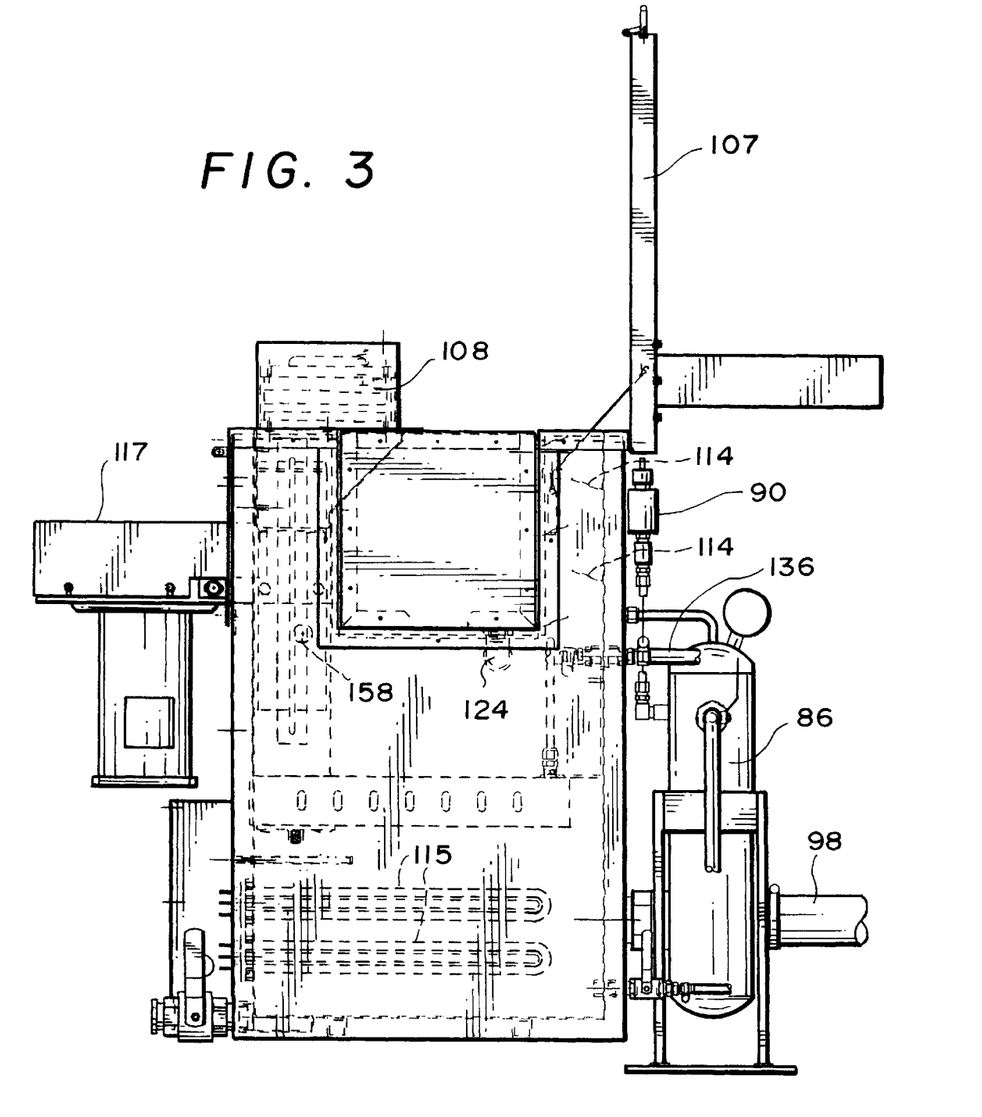
FIG. 3 is a side elevational view of the oil separator of FIG. 2.

As illustrated in FIGS. 3 and 4, the oil separator 80 comprises a lid 107 which substantially covers the tanks of the oil separator in a closed position (not shown). The lid does not cover the air inlet 110 or the air outlet 112 of the evaporating tank 100, so that the lid can be closed when the oil separator is operating.

Referring to FIG. 2, as water evaporates from the evaporating tank 100, the emulsion floating in the coalescing tank 92 flows into the evaporating tank through the evaporating tank feed pipe 102 to maintain approximately the same level in the coalescing and evaporating tanks. The upper end 104 of the evaporating tank feed pipe is positioned slightly below the surface level in the coalescing tank to ensure that emulsion, and not detergent solution, flows into the evaporating tank.

The emulsion introduced into the evaporating tank 100 is comprised of about 40–50% oil, with the balance being water and detergent. Because the oil content of the emulsion is relatively high as compared to the water content, only a small amount of water must be evaporated in the evaporating tank to concentrate the detergent contained therein.

The coalescing tank return pipe shield 96 may optionally be removed so that the emulsion in the wash solution is not allowed to coalesce in the coalescing tank 92. In such instances, the contaminated wash solution containing emulsion, water and detergent solution is introduced into the evaporating tank 100 through the evaporating tank feed pipe 102 as water evaporates in the evaporating tank. The wash solution normally contains only about 2–10% oil, and a relatively much higher percentage of water than the emulsion. Accordingly, a larger quantity of water must be evaporated in the evaporating tank to concentrate the detergent as compared to introducing only the emulsion into the evaporating tank.

A liquid turbocharger 117 is provided in the evaporating tank 100 to blend the emulsion or wash solution from the coalescing tank 92 with a highly concentrated detergent solution herein referred to as "the concentrate," to form a blended solution. The concentrate is preferably the same type of detergent solution used in the wash solution in the wash tank 20, but the concentrate has a ratio of detergent to water preferably about ten times that of the detergent solution contained in the wash solution. The blended solution has a lower concentration of detergent than the concentrate and, so, the concentrate is effectively diluted by the wash solution. Accordingly, water is continuously evaporated in the evaporating tank to maintain a proper detergent concentration therein.

Figure 6:
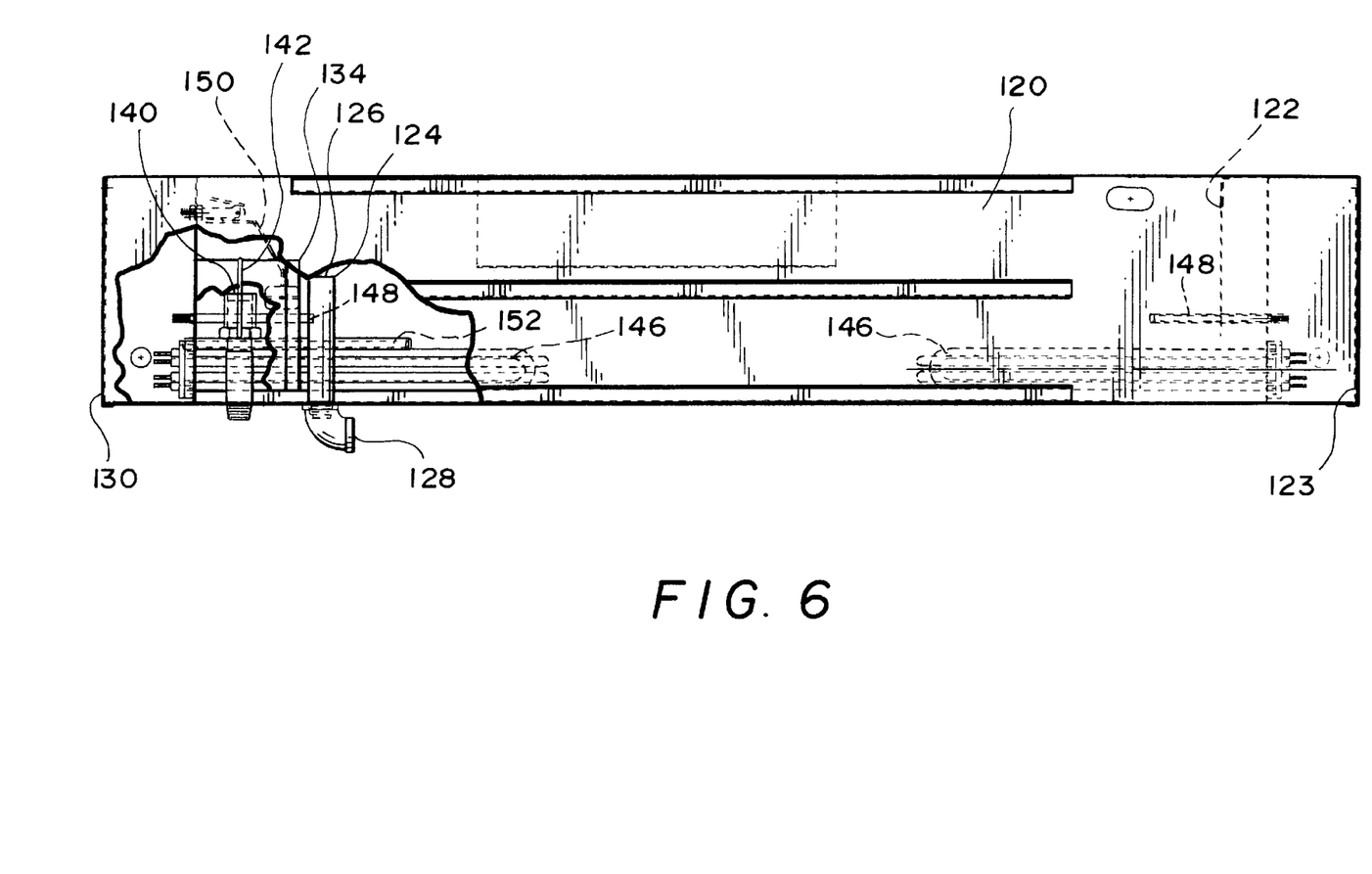
FIG. 6 is a partially broken away side elevational view of an oil separating tank in accordance with a preferred embodiment of the invention.

As illustrated in FIGS. 2 and 6, the oil separator 80 comprises an oil de-emulsification tank 120 for separating the oil and detergent in the blended solution. The liquid turbocharger 117 pumps a controlled amount of the blended solution upward through a oil separating tank supply line 118 and into the oil de-emulsification tank which is mounted above the evaporating tank 100. The blended solution is introduced behind a separating tank emulsion shield 122 mounted near the end 123 of the de-emulsification tank. The emulsion shield 122 traps emulsion and prevents it from floating across the surface of the de-emulsification tank to an oil weir 124. The oil weir is open at an upper end 126 located within the de-emulsification tank, and also at a lower end 128 positioned in the evaporating tank 100. The emulsion shield 122 directs the emulsion downward toward the bottom of the de-emulsification tank where separation of the oil in the emulsion is initiated.

The solution within the oil de-emulsification tank 120 flows slowly toward the end 130 through a coalescing material 132 (FIG. 4). The coalescing material is comprised of a plurality of layers of a plastic mesh material, preferably arranged in a parallel configuration. The openings in the mesh are impermeable to emulsified oils, but are permeable to de-emulsified oils and detergent solution. The plastic material prevents any emulsion that travels to the surface from floating the length of the de-emulsification tank and going down an oil overflow (not shown) and contaminating the separated oil. The number of layers of plastic mesh may be varied depending on the type of oil to be separated. For example, additional layers may be required for relatively more difficult to separate oils. Polypropylene is the preferred mesh material because it is compatible with most machining oils and also with the detergent solution.

In the oil de-emulsification tank, the oil in the solution naturally floats upward due to its relatively lower specific gravity than the detergent. The oil forms a surface layer, and the liquid beneath the oil layer is comprised mostly of detergent and water when it reaches a detergent return weir shield 134 located adjacent to the oil weir 124.

The concentrated detergent solution further causes the oil to separate from detergent and water in the emulsion and rise to the surface and increase the thickness of the oil layer. The concentrated detergent is formulated to vary the solubility of oils in the detergent. At the relatively low concentration level of the detergent in the wash solution, the detergent has a high solubility with respect to oil and readily removes oils from the parts and maintains it in suspension in an emulsion. When the concentrate and emulsion are blended together, the significantly greater concentration of detergent in the concentrate substantially reduces the solubility of the oil in the blended solution. As a result, as the blended solution settles in the de-emulsification tank, the oil separates from the detergent in the emulsion.

The separated surface oil layer in the de-emulsification tank 120 is unable to flow under the detergent return weir shield 134. When the height of the oil layer reaches the upper opening 126 of the oil weir, oil drains out of the de-emulsification tank through an oil outlet conduit 136 and into an oil holding container 138 (FIG. 1). The separated oil may be reused to machine parts, depending on its condition. In some instances, the separated oil may have an excessive water content to be reused for machining and must be recycled or properly disposed of.

The detergent in the oil de-emulsification tank flows under the detergent weir shield 134, enters an upper opening 140 of a detergent weir 142 and flows into a detergent holding tank 144 (FIG. 2). The detergent exits the tank 144 through a detergent outlet 145.

De-emulsification tank heaters 146 are mounted in the de-emulsification tank 120 to maintain the liquid preferably at a temperature of from about 190° F. to 195° F. Temperature sensors 148 monitor the temperature of the liquid and control the heaters 146 to maintain the desired temperature. A float switch 150 is provided to deactivate the heaters if the liquid level in the de-emulsification tank drops below a set level. A high temperature safety switch 152 is provided as an additional safety measure to shut off the heaters in the event of overheating.

When the detergent concentration in the wash tank 20 falls below a set concentration according to the conductivity sensor 24, recycled concentrated detergent from the detergent holding tank 144 is added to the wash tank. The concentrated detergent is pumped through a conduit 154 by a wash tank recharge pump 156. By periodically recharging the wash tank with concentrated detergent, the cleaning ability of the wash solution is maintained to ensure continuous, complete cleaning of oily parts.

A detergent holding tank overflow 158 (FIG. 3) is provided so that if the wash tank 20 does not require charging with detergent and the detergent holding tank 144 is full, the excess detergent is returned to the evaporating tank 100.

The conductivity sensor (not shown) contained in the unit 116 continuously monitors the detergent concentration. Referring to FIG. 1, the conductivity sensor activates a recharge pump 160 when the concentrate conductivity drops below a set point of preferably about 50 mS. The recharge pump 160 pumps concentrated detergent from a concentrate supply tank 162 into the evaporator tank via a conduit 164.

The parts cleaning system in accordance with the preferred embodiment of the invention has many advantages, including the ability to consistently clean machine parts and other objects. The present invention is a closed loop system which maintains an effective concentration of detergent in the wash tank to ensure continuous cleaning of oily parts. The system effectively separates used oils and detergents from the wash solution using a concentrated form of detergent, and reintroduces the separated detergent into the wash tank for further parts cleaning. The separated oil may be reused for parts machining. The system achieves virtually zero discharge of liquid waste streams and, therefore, overcomes a substantial problem associated with the known parts cleaning systems. In addition, the system conserves water and detergent.

Furthermore, the present invention produces negligible exhaust emissions due to evaporation from the oils and detergent. In fact, the exhaust emissions are substantially below the OSHA emission standards for sodium metasilicate pentahydrate, sodium xylene sulfonate, benzene, 1,1,1-trichloroethane, acetone, toluene, xylenes and oil mist.

The foregoing description of the preferred embodiment of the invention has been presented to illustrate the principles of the invention and not to limit the invention to the particular embodiment illustrated. It is intended that the scope of the invention be defined by all of the embodiments encompassed within the following claims, and their equivalents.

What is claimed is:

1. A method of cleaning oily objects and separating oil and detergent contained in a washing solution so that the detergent is reused for further cleaning of oily objects, the method comprising the steps of:

a) immersing an oily object in a wash tank containing a first solution having a first concentration of a detergent therein effective to remove oil from the oily object and to emulsify the removed oil and form a contaminated wash solution containing an oil emulsion including detergent and oil;

b) withdrawing contaminated wash solution from the wash tank and conveying the contaminated wash solution to an oil separator;

c) mixing the contaminated wash solution containing the oil emulsion, in the oil separator, with a second solution containing a second concentration of the detergent therein and which second concentration is greater than said first concentration to thereby initiate de-emulsification of the separated oil emulsion and form a blended solution;

d) evaporating, in an evaporator of the oil separator, water from the blended solution to thereby concentrate oil and detergent in the blended solution;

e) thereafter de-emulsifying the oil emulsion from the blended solution and separating the concentrated oil and detergent from one another; and f) recycling a first portion of the separated detergent to the wash tank to maintain the concentration of the detergent in the first detergent solution at said first concentration.

2. The method of claim 1 in which the step of separating oil emulsion from the contaminated wash solution includes introducing the contaminated wash solution from the wash tank into a coalescing tank of the oil separator wherein the oil emulsion is allowed to separate from the wash solution.

3. The method of claim 2 including the additional step of recycling wash solution from the coalescing tank to the wash tank.

4. The method of claim 3 in which a second portion of the separated detergent is recycled to the second solution to thereby maintain the said second concentration of detergent in the second solution.

5. The method of claim 4 including heating the blended solution comprising the separated oil emulsion and detergent as water is evaporated while simultaneously agitating the blended solution.

6. The method of claim 5 including heating the concentrated oil and detergent during separation of the concentrated oil and detergent.

7. The method of claim 1 in which a first portion of the separated detergent is recycled to the second solution to thereby maintain the second concentration of detergent in the blended solution.

8. The method of claim 7 including heating the blended solution including the separated oil emulsion and detergent as water is evaporated while simultaneously agitating the blended solution.

9. The method of claim 8 including facilitating evaporation of water by inducing a gas flow across a surface of the blended solution.

10. The method of claim 8 including heating the concentrated oil and detergent during separation of the concentrated oil and detergent.

11. A method of cleaning oily objects and separating oil and detergent contained in a washing solution so that the detergent is reused for further cleaning of oily objects, the method comprising the steps of:

a) immersing an oily object in a wash tank containing a first solution having a first concentration of a detergent therein effective to remove oil from the oily object and to emulsify the removed oil and form a contaminated wash solution containing an oil emulsion including detergent and oil;

b) withdrawing contaminated wash solution from the wash tank and conveying the contaminated wash solution to an oil separator;

c) separating the oil emulsion from the contaminated wash solution in the oil separator and thereafter mixing the separated oil emulsion with a second solution containing a second concentration of the detergent therein and which second concentration is greater than said first concentration to thereby initiate de-emulsification of the separated oil emulsion and form a blended solution;

d) evaporating, in an evaporator of the oil separator, water from the blended solution to thereby concentrate oil and detergent in the blended solution;

e) thereafter de-emulsifying the oil emulsion from the blended solution and separating the concentrated oil and detergent from one another; and f) recycling a first portion of the separated detergent to the wash tank to maintain the concentration of the detergent in the first detergent solution at said first concentration.

* * * * *